Nov. 20, 1923.  
F. R. SHUGART  
1,474,919  
WHEELBARROW  
Filed March 14, 1922  
2 Sheets-Sheet 1
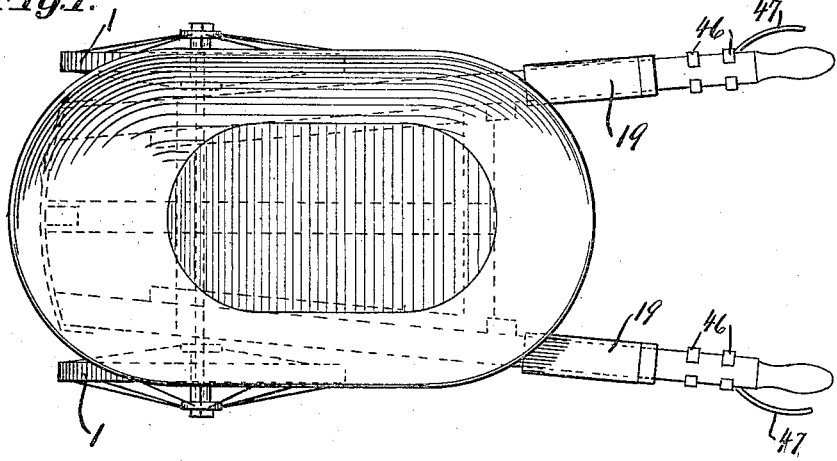
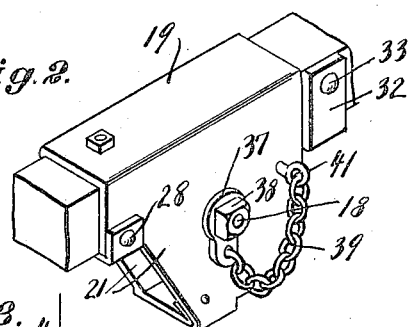
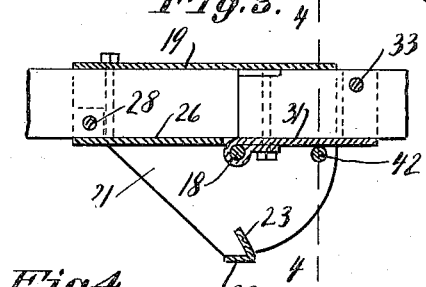
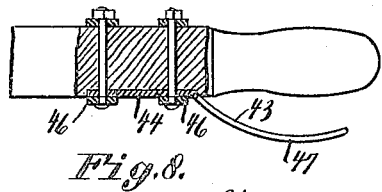
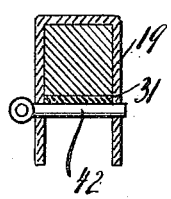
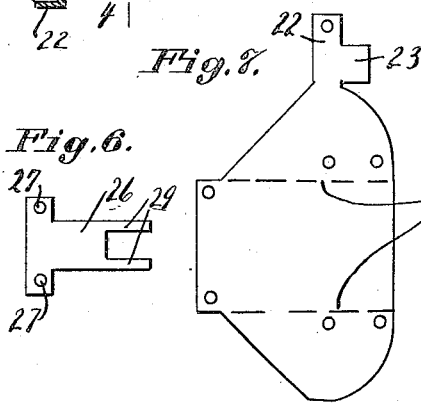
Inventor.  
F. R. Shugart  
By  
Attorneys.

Nov. 20, 1923.

F. R. SHUGART

WHEELBARROW

Filed March 14, 1922

1,474,919

2 Sheets-Sheet 2

Inventor.
F. R. Shugart.

Patented Nov. 20, 1923.

1,474,919

UNITED STATES PATENT OFFICE.

FREDERICK R. SHUGART, OF SACRAMENTO, CALIFORNIA.

WHEELBARROW.

Application filed March 14, 1922. Serial No. 543,608.

*To all whom it may concern:*

Be it known that I, FREDERICK R. SHUGART, a citizen of the United States, and a resident of Sacramento, county of Sacramento and State of California, have invented a new and useful Wheelbarrow, of which the following is a specification.

The present invention relates to improvements in wheelbarrows and its particular object is to provide a wheelbarrow presenting certain novel features which facilitate the handling of the same. The principal object of my invention is to provide mounting means for a wheelbarrow which increase its stability and at the same time allows a large portion of the load to be carried directly by the axle, thereby decreasing the load to be lifted by the operator.

A further object of the invention is to provide means facilitating the dumping of the contents of the wheelbarrow by providing a rigidly mounted support which takes over the load from the wheels when the wheelbarrow is in its dumping position. A further object is to provide skidding means in connection with the wheelbarrow which may be used as a brake in case the wheelbarrow is manipulated on a downward slope. A further object of the invention is the providing of a drop handle for the wheelbarrow that is easily detachable and hinged in such a manner that its extreme end can be dropped downwardly into almost vertical position, which not only saves space when the handles are not used, but also furnishes greater facilities in handling the same as, for instance, in dumping its contents. During the latter operation it frequently happens when the handles are rigid that a person handling the device has to lean forward considerably in order to allow all of the contents of the wheelbarrow to run out and that in doing so he loses his balance and has to let go of the handles altogether to keep from falling forward. Where my hinges are used this danger is eliminated altogether since the turning of the handles on their hinges enables the operator to remain in a position which does not expose him to the danger of losing his balance. A particular advantage of my device over other devices attempting to solve the same problem is the fact that my handles are secured to the wheelbarrow in such a manner that the structure is perfectly rigid on all sides except the one on which it is hinged, and that it can be made rigid with respect to this side also.

Figure 9:
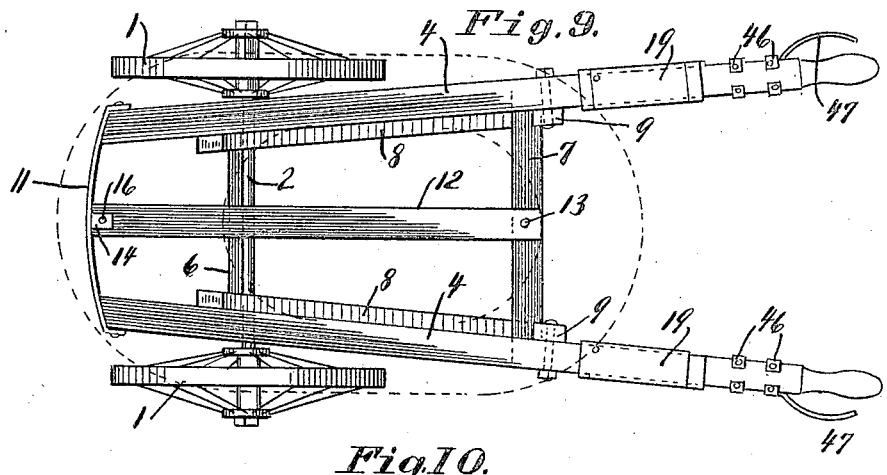
Figure 10:
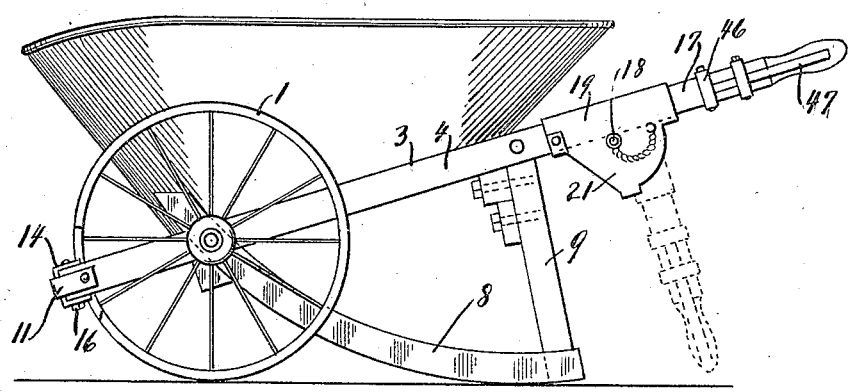
Figure 11:
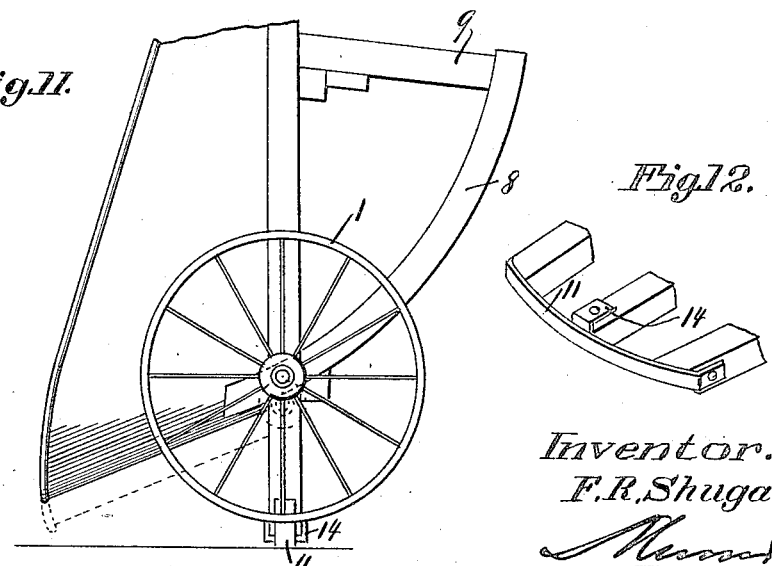
Figure 12:
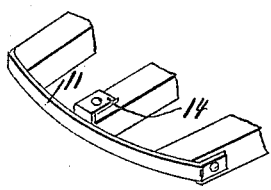

With these and other objects in view I have illustrated the preferred form of my invention in the accompanying drawing, in which Figure 1 illustrates a top plan view of my wheelbarrow; Figure 2 a perspective detail view of my hinging device; Figure 3 a longitudinal cross section through the same; Figure 4 a vertical cross section through the same along line 4—4 of Figure 3; Figure 5 a detail view of a guard for the hands of the operator; Figures 6, 7 and 8 detail views of patterns of which my hinging device may be constructed; Figure 9 a top plan view of my wheelbarrow with the body removed; Figure 10 a side elevation of my wheelbarrow; Figure 11 a side elevation partly broken away of the same wheelbarrow in its dumping position, and Figure 12 a perspective detail view of a ground engaging member or nose used during the dumping operation. While I have shown only the preferred form of my invention, it will be understood that various changes or modifications may be made within the scope of the claims hereto attached without departing from the spirit of the invention.

As distinguished from the commonly used type of wheelbarrows, mine is supported on two wheels (1) which are mounted in spaced relation on the axle (2). This axle furnishes one point of support for my frame (3) comprising two longitudinal shafts (4) slanting toward each other forwardly, as shown in Figure 9, and provided with transverse spacing members (6) and (7). The rear end of the frame is supported by the brake or skidding members (8) extending rearwardly from the axle (2) and held in spaced relation to the shafts (4) by braces (9). These members (8) make contact with the ground surface only when the wheelbarrow is at rest or when the operator lowers the handles, as he might do on a downward grade, in which case the said members act as a brake. The forward ends of the shafts (4) extend beyond the axle sufficiently far to slightly project over the rims of the wheels, and are connected by an arc-shaped metal member (11) which curves outwardly and the central portion of which is fortified by a longitudinal central brace (12) which extends throughout the length of the frame and is secured to the transverse member (7) as shown at (13) and to the axle (2). To increase the strength of the connection between the brace (12) and the metal member (11), I introduce a small strip of metal (14) at the end of the brace, the two ends of which are bent so as to overlap on the sides of the latter and are secured by means of a bolt (16).

The handles (17) are hingedly connected to the shafts (4) and are adapted to swing downwardly on the pin (18). The joint between each handle and its shaft is fortified by a sleeve (19) which latter surrounds the top and the two sides of the joint and is provided with two downwardly extending wings (21) serving as guide members for the handle when the latter is turned on its hinge. One of the wings has at its lower end a flap (22) which is adapted to bridge the space between the two wings and to be secured to the other wing so as to form a stop for the handle. To make this stop a comfortable seat for the handle, I provide a projection (23) which may be turned upward so as to occupy a position exactly parallel to that of the handle in its most downward position. A pattern for this sleeve is shown in Figure 7 from which it will appear at once that when the pattern is bent along the two dotted lines (24) it will fit over the joint, whereupon the flap (22) may be bent toward the opposite wing and secured thereto while the projection (23) is bent upward into the desired position. The pin (18) is preferably provided at one end with a head like a bolt and threaded at the other end to receive a nut and may be loosened or tightened from the outside of the sleeve. The hinge members connecting each handle with its shaft are shown in detail in Figures 6 and 8. The member (26) shown in Figure 6 is secured to the end of the shaft (4), its two projections (27) being bent upward and fastened to the shaft by means of screws or rivets (28), while the two prongs (29) are bent on themselves so as to form holes adapted to receive the pin (18). The member (31) shown in Figure 8 is secured to the handle, the two projections (32) being bent upward and fastened by means of screws or rivets (33) while its far end (34) is bent on itself so that its neck (36) forms another hole to be engaged by the pin (18). The ring (37) may be slipped on the pin (18) underneath its nut (38) and supports the chain (39), the loose end of which carries stud (41) adapted to be inserted through perforations (42) in the sleeve. This stud serves to hold the handle in its alined position and prevents it from swinging on its hinge.

Special provision is made to protect the hands of the operator. For this purpose I use a strip of metal (43) comprising a straight portion (44) adapted to be secured to the side of the handle by means of straps (46) and a curved portion (47) turning away from the handle so as to leave sufficient space for the hand of the operator.

In operation, when the person handling the wheelbarrow has to pass through a narrow entrance it is not uncommon that his hands will come in contact with the frame of the entrance and will become injured due to the weight of the wheelbarrow. My guards (47) will receive in a case like this the first shock and thus protect the hands of the operator.

Considering the structural features of my invention, it will be seen that the principal part of the load is supported directly on the axle and that therefore the operator needs only to lift a small portion of the load, which latter is being reduced during the lifting process to almost nothing so that when the wheelbarrow is in its ordinary working position the load is substantially balanced over the axle. This feature makes my device far superior to the one wheel devices now commonly used which force the operator to support the whole load continuously. The over-all length of the wheelbarrow is also reduced substantially whereby its general usefulness is increased. The dumping of the load is facilitated by the fact that during the operation the whole load is transferred from the wheels to the nose (11), which is rigidly secured to the frame and prevents any backward or forward motion of the wheelbarrow.

The hinged connection of the handles not only allows of the quick removal of the same but also facilitates the dumping of the load and decreases the over-all length of the wheelbarrow, whereby its transportation in elevators or otherwise is facilitated. The particular construction of the sleeves renders the whole construction strong and durable so that the ruggedness of the ordinary wheelbarrow is hardly lessened by the addition of the hinge.

I claim:

1. In a wheelbarrow having body supporting shafts and handles associated therewith, a hinged connection between each shaft and its handle allowing the latter to drop relative to the former and including side guide members for guiding the handle, a stop supported between said members for limiting the motion of the handle, registering perforations in the guide members underneath the handles in their alined position and a pin flexibly supported on each hinge adapted to be inserted through the said perforations so as to render the connection rigid.

2. In a device of the character described, having a hinged connection between its shafts and handles, a guide member comprising a single piece of metal including a body portion adapted to be fitted over the top and along the sides of the hinged connection having wings extending downwardly from the sides and a strip extending from one of the wings adapted to bridge the gap between the two wings and to be secured to the second wing so as to form a stop for the handle.

3. In a device of the character described, having a hinged connection between its shafts and handles, a guide member comprising a single piece of metal including a body portion adapted to be fitted over the top and along the sides of the hinged connection having wings extending downwardly from the sides and a strip extending from one of the wings adapted to bridge the gap between the two wings and to be secured to the second wing and a flap turned upwardly from said strip so as to provide a rest for the handle.

FREDERICK R. SHUGART.